United States Patent
Weedermann et al.

(10) Patent No.: US 11,979,454 B2
(45) Date of Patent: May 7, 2024

(54) WRITEBACK TO A VIRTUAL MEDIA MAPPED IMAGE IN HTML5

(71) Applicant: Vertiv IT Systems, Inc., Huntsville, AL (US)

(72) Inventors: Joerg Weedermann, Santa Clara, CA (US); Joseph Amirthasamy, Weston, FL (US)

(73) Assignee: VERTIV IT SYSTEMS, INC., Huntsville, AL (US)

( * ) Notice: Subject to any disclaimer, the term of this patent is extended or adjusted under 35 U.S.C. 154(b) by 0 days.

(21) Appl. No.: 18/234,095

(22) Filed: Aug. 15, 2023

(65) Prior Publication Data

US 2024/0073275 A1   Feb. 29, 2024

Related U.S. Application Data

(60) Provisional application No. 63/402,000, filed on Aug. 29, 2022.

(51) Int. Cl.
*H04L 67/06* (2022.01)
*H04L 67/02* (2022.01)
*H04L 67/08* (2022.01)
*H04L 67/1097* (2022.01)

(52) U.S. Cl.
CPC .............. *H04L 67/06* (2013.01); *H04L 67/02* (2013.01); *H04L 67/08* (2013.01); *H04L 67/1097* (2013.01)

(58) Field of Classification Search
None
See application file for complete search history.

(56) References Cited

U.S. PATENT DOCUMENTS

| 7,783,686 B2 | 8/2010 | Gates et al. |
| 8,005,991 B2 | 8/2011 | Lo et al. |
| 8,640,126 B2 | 1/2014 | Halperin et al. |
| 8,706,947 B1 | 4/2014 | Vincent |

(Continued)

FOREIGN PATENT DOCUMENTS

CN    105051714 A    11/2015

OTHER PUBLICATIONS

Gupta et al., "Virtual machine for IOS devices", Mar. 10, 2022, IEEE, 2022 International Mobile and Embedded Technology Conference (MECON) (pp. 627-631) (Year: 2022).*

(Continued)

*Primary Examiner* — Davoud A Zand
(74) *Attorney, Agent, or Firm* — Suiter Swantz IP

(57) ABSTRACT

A system and method for transferring host data from a host server to a user device during a KVM session, using an HTML5 KVM/virtual media client running in a Web browser of a user device, is disclosed. The user device may run a Web browser that allows the user to select an image file which then appears as a new drive letter (e.g., a virtual drive) on the server system to be managed. The system and method bypass the inability of the read-only virtual drives to transfer files back to the HTML client of the user device by modifying the original files received from the user device, which are packaged and sent back to the user device via the persistent sandbox. In this manner, important log files and other data files generated from the host server may be received by the user device via a user-friendly Web browser.

18 Claims, 7 Drawing Sheets

(56) References Cited

U.S. PATENT DOCUMENTS

| | | |
|---|---|---|
| 8,819,674 B2 | 8/2014 | Parikh et al. |
| 9,026,635 B2 | 5/2015 | Maity et al. |
| 9,477,491 B2 | 10/2016 | Ben-Shaul et al. |
| 9,594,583 B2 | 3/2017 | Bonzini |
| 9,778,844 B2 | 10/2017 | Balakrishnan et al. |
| 10,178,170 B2 | 1/2019 | Rajagopalan et al. |
| 10,198,285 B2 | 2/2019 | Amirthasamy et al. |
| 2010/0317420 A1* | 12/2010 | Hoffberg ............ G06Q 30/0282 463/1 |
| 2012/0066677 A1* | 3/2012 | Tang .................... G06F 9/4856 718/1 |
| 2013/0159021 A1* | 6/2013 | Felsher ................. G16H 10/60 705/3 |
| 2014/0075281 A1* | 3/2014 | Rubin ................... G06F 40/169 715/230 |
| 2017/0078388 A1 | 3/2017 | Rajagopalan et al. |
| 2018/0032365 A1 | 2/2018 | Amirthasamy et al. |

OTHER PUBLICATIONS

United Kingdom Application No. GB2312578.4 Search Report dated Feb. 19, 2024.

* cited by examiner

WRITEBACK TO A VIRTUAL MEDIA MAPPED IMAGE IN HTML5

CROSS-REFERENCE TO RELATED APPLICATIONS

The present application claims the benefit under 35 U.S.C. § 119(e) of U.S. Provisional Application Ser. No. 63/402,000, filed Aug. 29, 2022, which is incorporated herein by reference in the entirety.

TECHNICAL FIELD

The present disclosure relates generally to virtual media protocols, and more particularly to a system and method for creating virtual disk images of selected data using a web browser of a user's computer. The virtual disk images are utilized by a remotely-located host server during a virtual keyboard, video, and mouse (KVM) session. The virtual disk image may be altered by the host server, for which the altered disk image may be transferred from the host server to a user device.

BACKGROUND

Present day keyboard, video, and mouse (KVM) appliances and baseboard management controllers (BMCs) allow a user to access remote servers and other devices by passing the keyboard, video, and mouse (KVM) signals between the user's device (typically a laptop, PC, tablet, smartphone, etc.) and the KVM appliance or BMC. For the purpose of discussion, the following examples will refer only to a KVM appliance, but it will be appreciated that they are equally applicable to communication with a BMC. The keyboard and mouse signals received by the KVM appliance are typically received by a network protocol, for example Ethernet protocol packets, and then converted to a format (e.g., USB) that the remote device can accept.

With the development of HTML5 technology, an HTML5 KVM/virtual media client is now able to run in the Web browser of a user's device when a KVM session is established by the user. Currently HTML5 is supported by several web browsers including Apple Corporation's IOS SAFARI™ Web browser, Mozilla's FIREFOX™ Web browser, the Google CHROME™ Web browsers, Amazon's Silk™ browser, the INTERNET EXPLORER™ (versions 10 and 11) Web Browser from Microsoft Corp., as well as Microsoft's EDGE™, the OPERA™ and OPERA MINI™ Web browsers developed by Opera Software. The ability to run the HTML5 KVM/virtual media client in the user's Web browser is a significant advantage because the user typically is highly familiar with using a Web browser. As such, this implementation provides the user with a comfortable, easy to use system for conducting a KVM session with a remote KVM device (e.g., KVM appliance or BMC).

The running of an HTML5 KVM/virtual media client in the user's Web browser, however, was initially limited by the inability of the web browser to allow the KVM/virtual media client access to the physical disks of the client device on which the Web browser is running (e.g., PC workstation, laptop, computing tablet, smartphone, etc.). This limitation did not exist with a KVM/virtual media client that did not run in the user's Web browser. The technology previously used, such as Java or ActiveX, allowed access to the physical media devices such as disk drives, and thus a disk image was not required to access the data files on the user device. In contrast, Web browsers provide a relatively small, temporary storage area termed a "sandbox". The JavaScript engine that runs in the Web browser can bring files into the sandbox. But the JavaScript engine still is not allowed to write out the files, nor is it allowed direct access to the physical media devices on the user's device, such as disk drives, typically used in virtual media implementations. Furthermore, the storage of a temporary sandbox is quite small in size, approximately 5 5 MB, presenting a significant limitation to creating disk images.

A system and method to overcome these limitations was addressed in U.S. Pat. No. 10,198,285 entitled, "SYSTEM AND METHOD FOR CREATING VIRTUAL DISK IMAGES FOR USE WITH A REMOTE COMPUTER", filed on Feb. 5, 2019 by assignee of the present application and which is incorporated by reference in its entirety. This system and method made use of Web browsers based on Chromium™ software (e.g., Chrome™ and Microsoft Edge™ Web browsers) having a temporary sandbox with a particularly high storage capacity and also allowing files to be written directly into the persistent sandbox. The method included mapping the storage device on the host server, creating a disk image of the storages device's content in the persistent sandbox of the Web browser, and using the host server to obtain a virtual disk image of the content from the persistent sandbox, ultimately leading to the transfer of data corresponding to the virtual disk image from the client computer to the host server. Utilizing Chromium™ based Web browsers, the system and method disclosed in U.S. Pat. No. 10,198,285 allowed host data files, such as large (greater than 5 MB) update files to be transferred to the host server via the HTML5 KVM/virtual media client running in the Web browser of the user's device.

Although the system and method disclosed in U.S. Pat. No. 10,198,285 permits the transfer of files from the client to the remote host server, this virtual media protocol provides only for one-way transfer of information. Because virtual image files appear as read-only drives to the host server, the host server is not able to write back any files or data back to the client computer. The inability for host servers to write back files to the client computer prevents log files, data files, and other records that the host produces from being shared with the client computer, or other client computers that utilize the host server. Accordingly, it may be advantageous for a system and method to remedy the shortcomings of the conventional approaches identified above.

SUMMARY

Accordingly, a system and method for transferring host data from a host server to a user's device during a KVM session, using an HTML5 KVM/virtual media client running in a Web browser of a user's device, is disclosed. The system and method utilized is related to "virtual media" features used in service processors to manage servers (e.g., host servers) remotely. In this system and method, a client computer or user device runs a Web browser that allows the user to select an image file (e.g., a block-by-block copy of a client storage device, such as a USB memory device, also known as a USB stick), which then appears as a new drive letter (e.g., a virtual drive) on the server system to be managed. This organization allows files to be transferred from the user device to the host server. The system and method bypass the inability of the read-only virtual drives to transfer files back to the HTML client of the user device by modifying the original files received from the user device, which are packaged and sent back to the user device via the persistent sandbox. In this manner, important log files and other data files generated from the host server may be received by the user device via a user-friendly Web browser.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Figure 1:
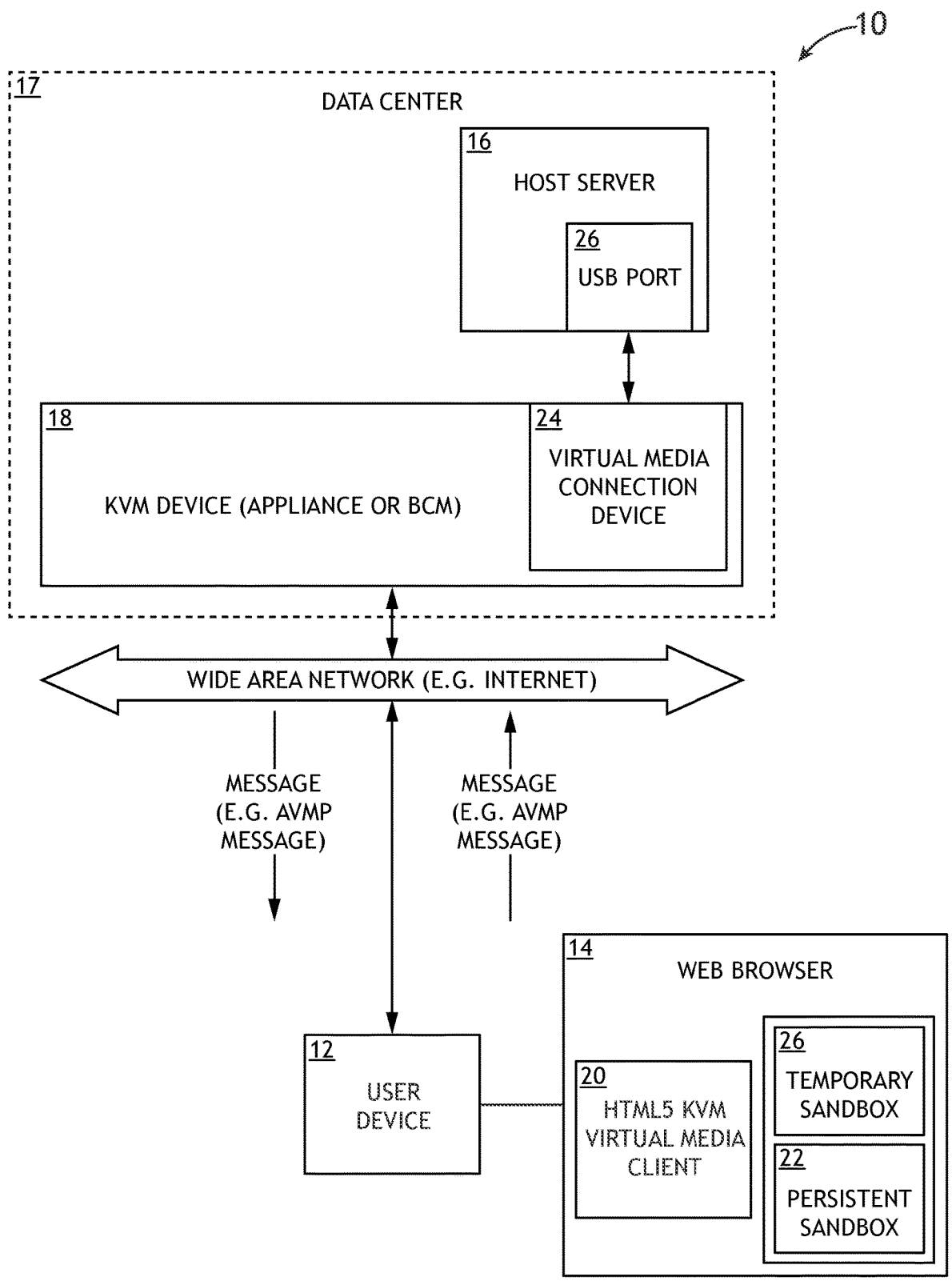
FIG. 1 is a diagram of a system in which a user device having a Web browser running thereon, is used to conduct a KVM session with a remotely located host server at a data center in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "embodiments" means that a particular element, feature, structure, or characteristic described in connection with the embodiment is included in at least one embodiment disclosed herein. The appearances of the phrase "in embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a diagram of a system 10 is shown in which a user device, in this example a workstation 12 (e.g., workstation computer) having a Web browser (e.g., a Chromium™-based web browser) 14 running thereon, is used to conduct a KVM session with a remotely located Host server 16 at a Data Center 17. A KVM device, in this example, a KVM appliance 18, connects the user workstation 12 with the Host server 16. However, it will be appreciated that a BMC may be implemented in place of a KVM appliance. For the purpose of discussion, reference will be made to the KVM device as being a KVM appliance.

The Web browser 14 may have an HTML5 KVM/virtual media client 20 running in it. The Web browser 14 also provides a temporary sandbox 21 and a persistent sandbox 22, which are dedicated memory spaces into which a JavaScript engine running in the Web browser 14 may manage files or portions of files. However, as noted above, the JavaScript engine is not able to write the files out to, nor is it permitted direct access to, any of the physical devices (disk drive, flash drive) that are contained within the workstation 12 or physically connected to the workstation 12. It is contemplated that an individual file browser may be included which may contain image files or portions of image files stored in the temporary sandbox 21 and a persistent sandbox 22 and may be visible to the user in the user interface.

The HTML5 KVM/virtual media client 20 communicates with the Host server 16 via the KVM appliance 18, a virtual media connection device 24 inside the KVM appliance 18, a USB port 26 of the Host server 16, and a wide area network connection (e.g., the Internet). Messages, for example and without limitation AVMP (Avocent Virtual Messaging Protocol) messages, are communicated between the HTML5 KVM/virtual media client 20 and the Host server 16 when virtual disk images are created on the workstation 12 and exposed to the Host server 16, and when status updates (e.g., number of bytes transferred) are sent from the HTML5 KVM/virtual media client to the Host server 16. Creating virtual disk images of files and/or directories on the disk drives of the workstation 12, and exposing the virtual disk images to the Host server 16, allowing the Host server 16 to access the contents on any of the disks of the workstation 12, as well as any virtual media device (e.g., flash drive, portable memory device, etc.) that may be physically connected to the workstation 12.

Figure 2A:
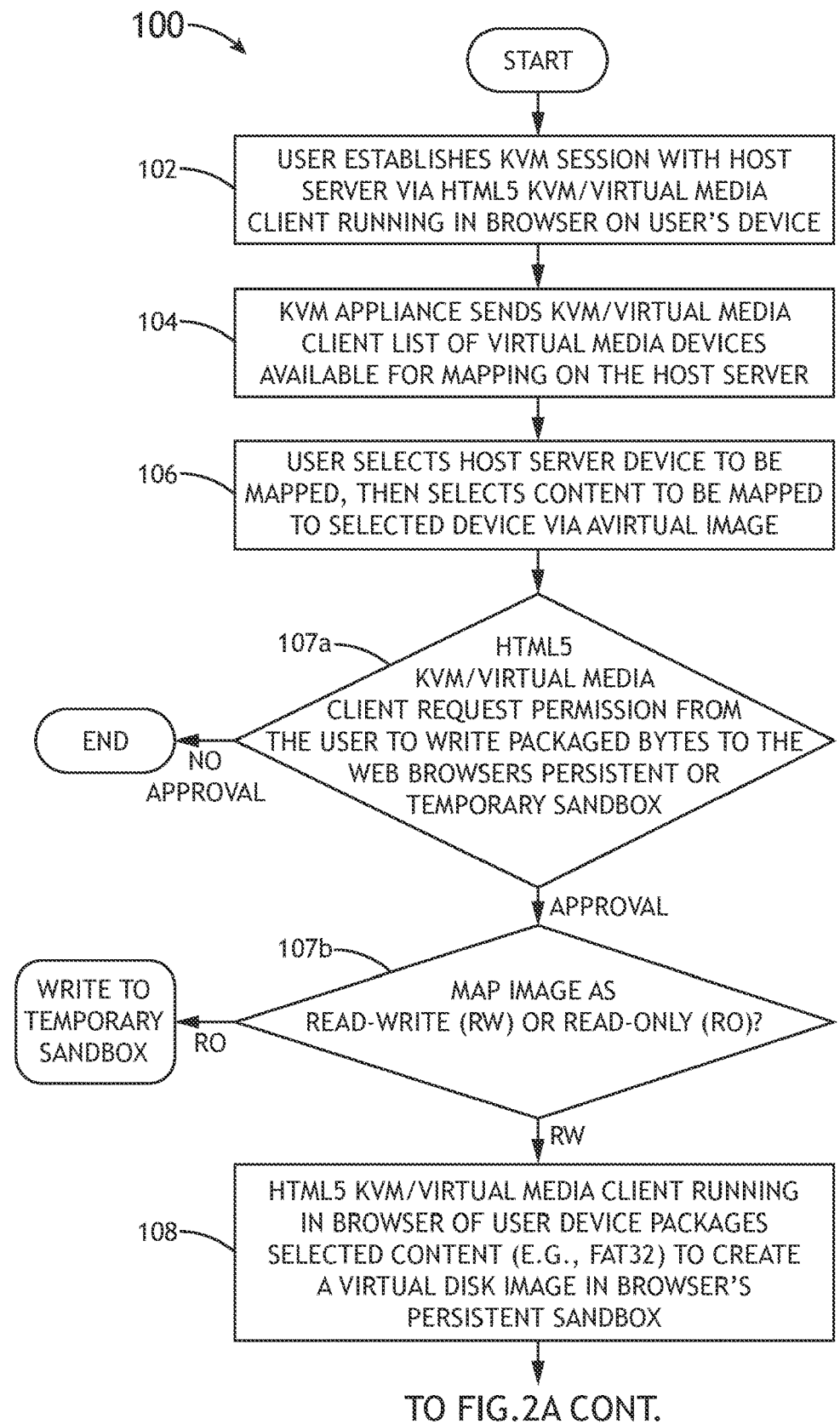
FIGS. 2A and 2B are flowcharts illustrating a sequence of operations between the HTML5 KVM/virtual media client and the Host server in accordance with one or more embodiments of the present disclosure.
Figure 2A:
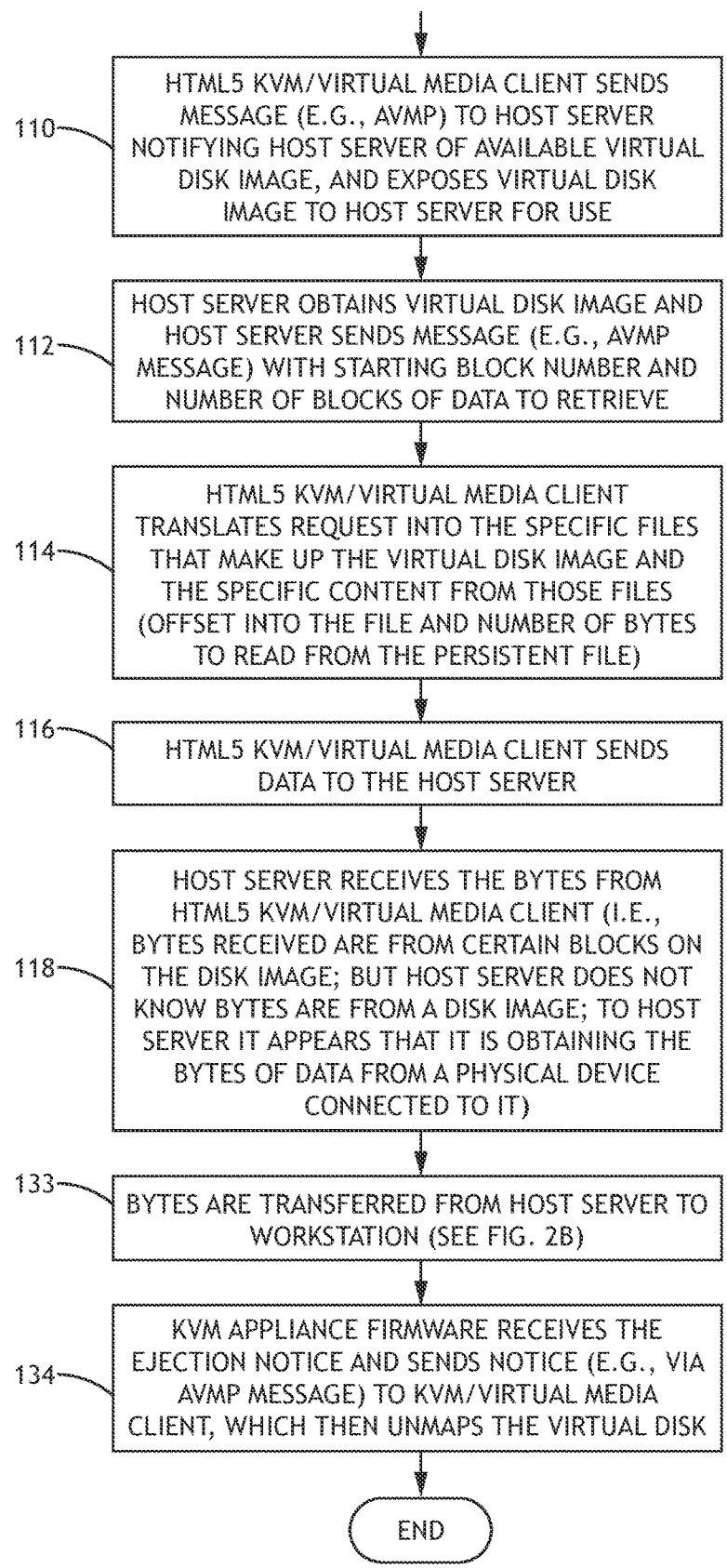
Figure 2B:
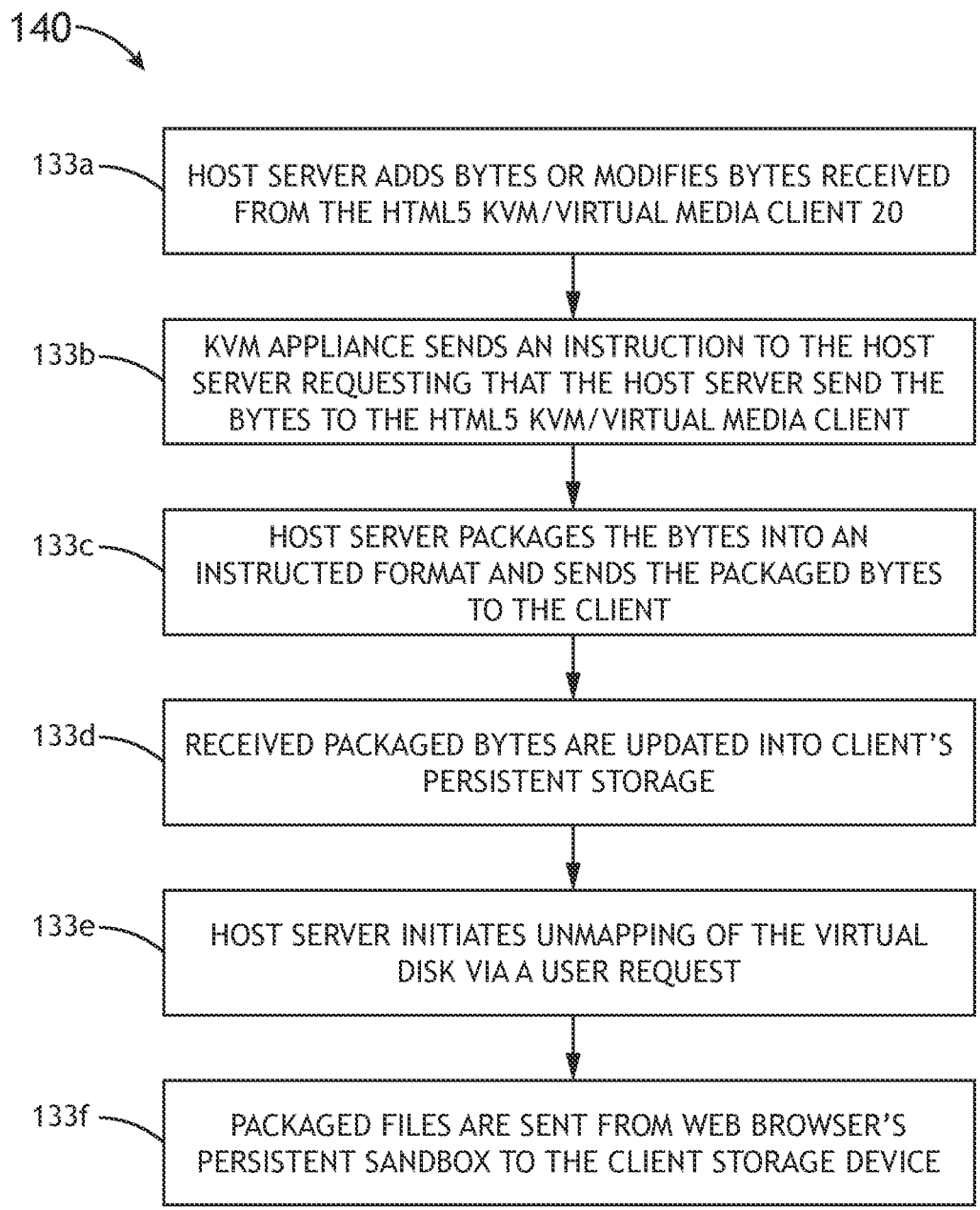

Referring now to FIGS. 2A and 2B, flowcharts 100, 140 illustrating a sequence of operations between the HTML5 KVM/virtual media client 20 and the Host server 16 are shown. Initially at operation 102 (FIG. 2A) the user establishes a KVM session with the Host server 16 via the HTML5 KVM/virtual media client 20 running in the user's Web browser 14. At operation 104 the KVM appliance 18 sends the HTML5 KVM/virtual media client 20 a list of virtual media devices available for mapping on the Host server 16. At operation 106 the user selects the Host server device to be mapped, and then selects specific content to be mapped via a virtual disk image. The content to be mapped may be a specific file or possibly a directory or subdirectory.

At operation 107a, the HTML5 KVM/virtual media client 20 requests permission from the user to write a virtual disk image (e.g., in the form of packaged bytes) to the Web browser's persistent sandbox 22 or temporary sandbox 21. This request may be implemented at various times in the method. If the user does not approve the request, the method may terminate (e.g., end). If the user approves the request, the method progresses to operation 107b, where image will be mapped as a read-only (RO) or read-write (RW) image based on the client approval. The request-and-approval sequence for 107a-b may take various forms. For example, a user may receive a permission dialog asking for a decision to map the image as RO or RW. In another example, the user may receive a permission dialog asking if the user approves the browser writing the image into the persistent sandbox and/or writing the now-modified content of the persistent sandbox copy of bytes back into an image file on the file system of the workstation 12, allowing access and processing of the image file by the user. In another example, the system may automatically decide to map the image as RO or RW (e.g., based on default criteria set up by the user). If the decision is made to map the image as RO, then the image will be copied to the temporary sandbox 21.

If the decision is made to map the image as RW, the flowchart continues on to operation 108, wherein the HTML5 KVM/virtual media client 20 packages the selected content using a selected format (e.g., FAT32) to create a virtual disk image of the selected content in the browser's persistent sandbox 22. Upon mapping the image as RW, all of the WRITE-block commands that are being sent from the Host server 16 back to the HTML5 KVM/virtual media client 20 will now alter the data of the according blocks in the persistent sandbox of the Web browser 14.

At operation 110 the HTML5 KVM/virtual media client 20 sends a message to the Host server 16 notifying the Host server of the available virtual disk image, and exposes the virtual disk image to the Host server 16 for use. Regarding the message that may be sent, it will be appreciated that any messaging protocol may be employed, including but not limited to AVMP (Avocent Virtual Message Protocol) messages may be used. The Avocent Virtual Messaging Protocol is a proprietary protocol of Avocent, Inc., a Vertiv company.

At operation 112 the Host server 16 obtains the virtual disk image and then sends a message (e.g., AVMP message) back to the HTML5 KVM/virtual media client 20 with the starting block number and number of blocks of data to retrieve. At operation 114 the HTML5 KVM/virtual media client 20 responds to the request by translating the request into the specific files that make up the virtual disk image and the specific content from those files (e.g., offset into the file and number of bytes to read from the persistent file from the persistent sandbox). It will also be appreciated that creating the virtual disk image involves creating the structural elements of a disk image such as the boot sector and FAT tables. The data of a disk image typically stored in files within the disk image is not part of the virtual disk image. Instead, the present system and method keeps references to the files so that when a request for a certain data block (or set of blocks) is received, a reverse lookup may be performed. The reverse lookup determines which files contain the requested data, and then an operation may be performed to go and retrieve that data from the client workstation. The data is retrieved by copying those portions of the required files into the persistent sandbox 22 and then transmitting the data to the Host server 16. The files which make up the disk image are not brought into the persistent sandbox 22 until their data is needed, and then only those portions of the files that are needed are brought into the persistent sandbox. Accordingly, this methodology forms a type of "on-demand" system.

At operation 116 the HTML5 KVM/virtual media client 20 sends the data represented by the selected bytes to the host server 16. At operation 118 the host server 16 receives the transmitted bytes. It will be appreciated that the bytes received by the host server 16 are from certain blocks on the virtual disk image. However, the Host server 16 does not know that the bytes are from a disk image. To the Host server 16, it appears that it is obtaining the bytes of data from a physical device connected to its USB port 26.

In some embodiments, the system 10 may perform operations to determine if additional bytes are needed for completing the transfer of bytes. These operations are detailed in U.S. Pat. No. 10,198,285 entitled, "SYSTEM AND METHOD FOR CREATING VIRTUAL DISK IMAGES FOR USE WITH A REMOTE COMPUTER", which is incorporated by reference in its entirety.

At operation 133, of bytes are transferred from the Host server 16 to the workstation 12. For example, content from the persistent sandbox (e.g., the RW image file) may be saved to the web browser (e.g., the Downloads area) as a new image file, which now contains the modified bytes of the Host server 16. Sub-operations of operation 133 are further detailed in FIG. 2B. At operation 134 the KVM appliance 18 firmware receives the ejection notice and sends a message (e.g., AVMP message) to the HTML5 KVM/virtual media client 20, which then unmaps the virtual disk image.

Referring to FIG. 2B, the operation 133 of transferring bytes from the host server 16 to the workstation 12 is shown expanded within a flowchart 140 as operations 133a-f. At operation 133a, the host server 16 adds bytes or modifies bytes received from the HTML5 KVM/virtual media client 20 (e.g., as received in operation 118). The bytes added or modified by the host server 16 may include any type of data including but not limited to log data or data records that the host server 16 produces.

After bytes are added and/or modified, the KVM appliance 18 sends an instruction to the host server 16 requesting that the host server 16 send the bytes to the HTML5 KVM/virtual media client 20 as indicated in operation 133b. The bytes may include the added and/or modified bytes as well as a portion of the original file sent from the HTML5 KVM/virtual media client 20 to the host server 16. In preparation for transferring the added and/or modified bytes to the HTML5 KVM/virtual media client 20, the host server packages the bytes into an instructed format (e.g., FAT type filesystems, such as FAT32), and sends the packaged bytes to the client as indicated in operation 133c.

At operation 133d, the received packaged bytes are updated into the client's persistent storage. The host server then initiates unmapping of the virtual disk via the user request (e.g., from operation 107a), as indicated in operation 133e. In some embodiments, the method 100 may utilize a user-triggered action to take a snapshot of the current persistent sandbox image content, and store this content back to the file on the local disk, while leaving the original mapped file still mapped. This embodiment may require the snapshot to be stored with a different filename, as an image file cannot be overwritten that is still mapped. At operation 133*f*, the packaged files, in the form of a disk image, are sent from the Web browser's persistent sandbox 22 to the client storage device.

By using the HTML5 KVM/virtual media client 20 to create virtual disk images, and to expose the virtual disk images to the host server 16, the inability of the Web browser to directly access the physical disks on the workstation 12 is at least partially overcome. However, the ability of the host server 16 to boot off of the physical disks on the client workstation is lost because the persistent sandbox 22 will not allow the HTML5 KVM/virtual media client 20 to read the boot section of the physical device. Essentially, any data content stored on the disks of the workstation 12 as files, as well as any virtual media device accessible to the workstation 12 through a physical connection with the workstation, is accessible to the host server 16. Being able to run the HTML5 KVM/virtual media client 20 in the Web browser 14 also significantly adds to the ease of use for the user because of the user's familiarity with using the Web browser.

Figure 3A:
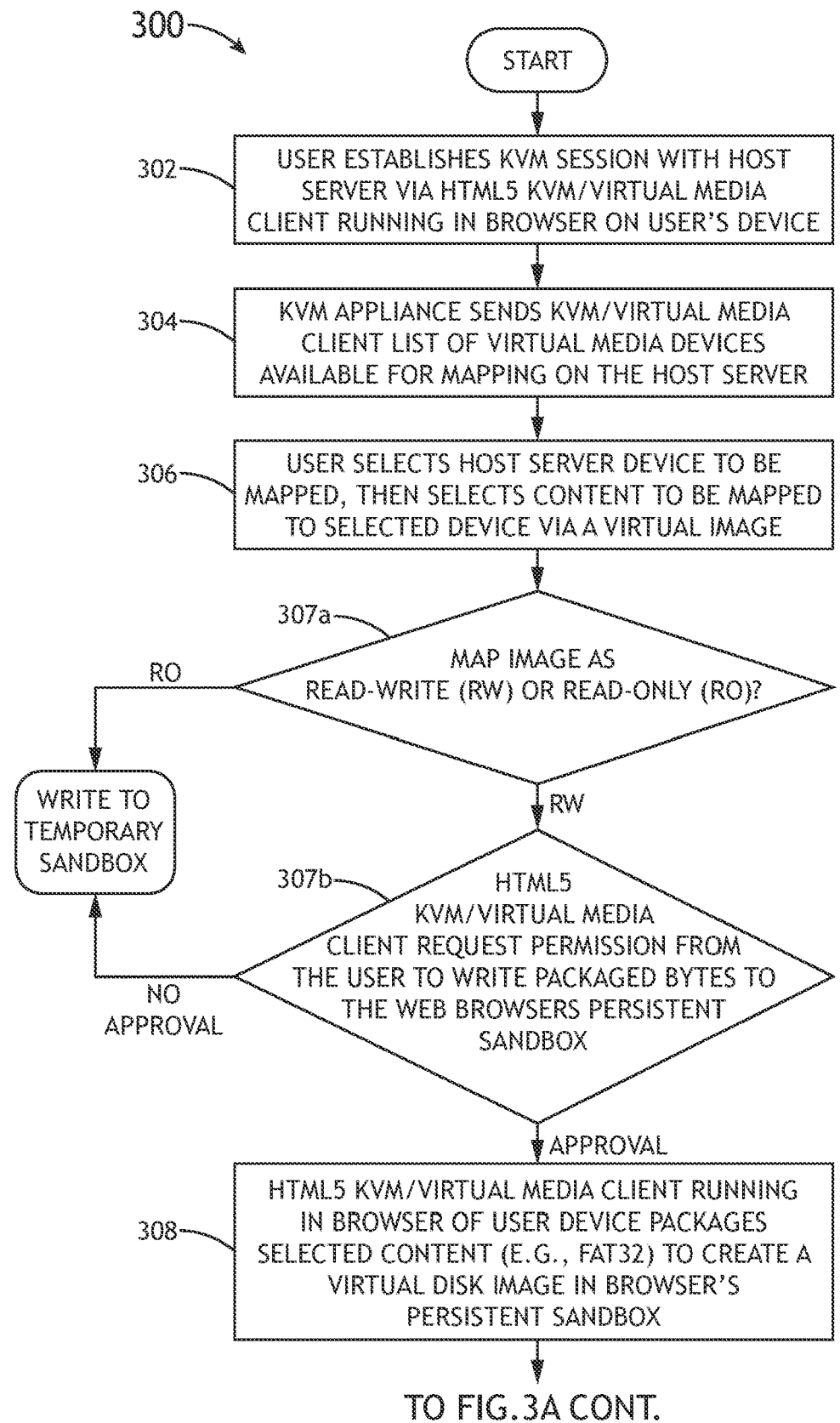
FIGS. 3A and 3B are flowcharts illustrating a sequence of operations between the HTML5 KVM/virtual media client and the Host server in accordance with an additional embodiment of the present disclosure.
Figure 3A:
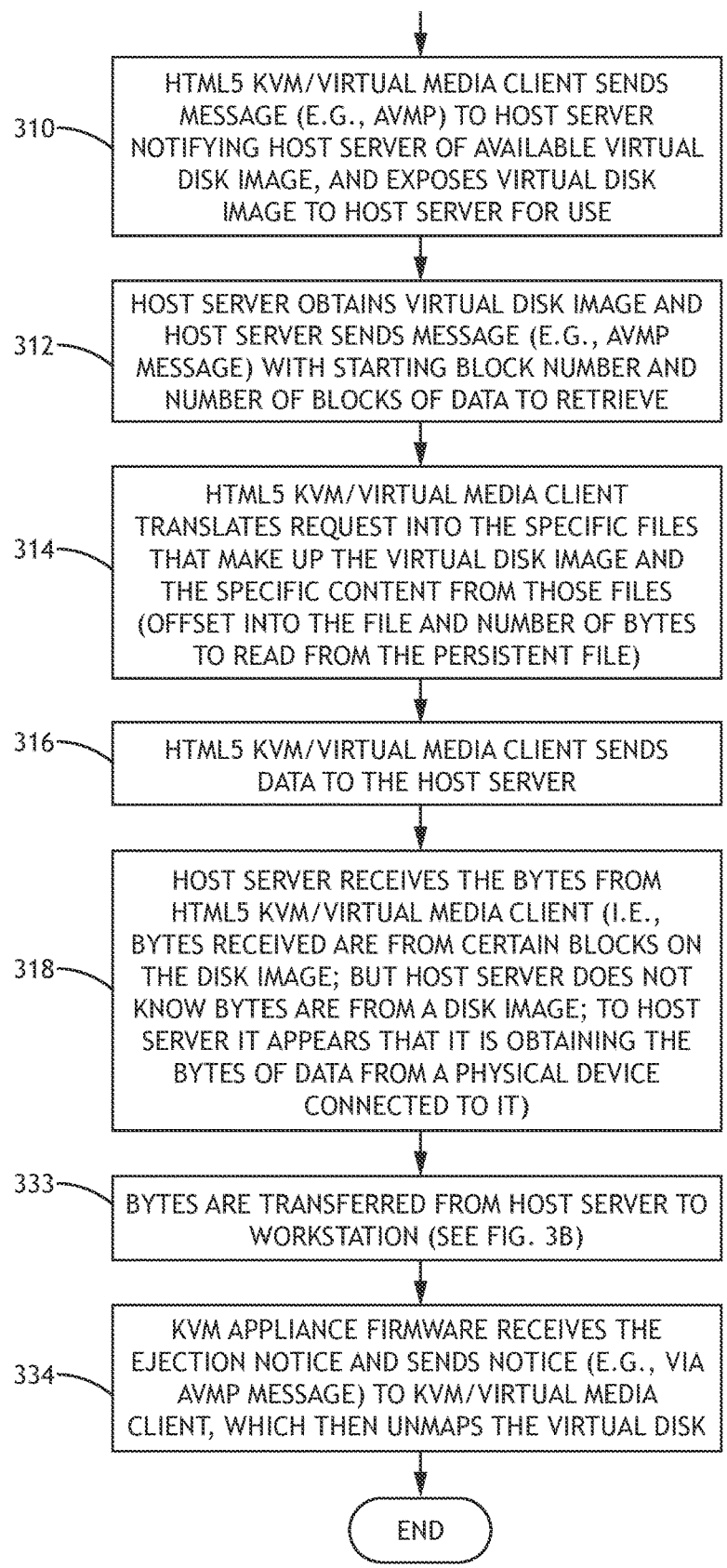
Figure 3B:
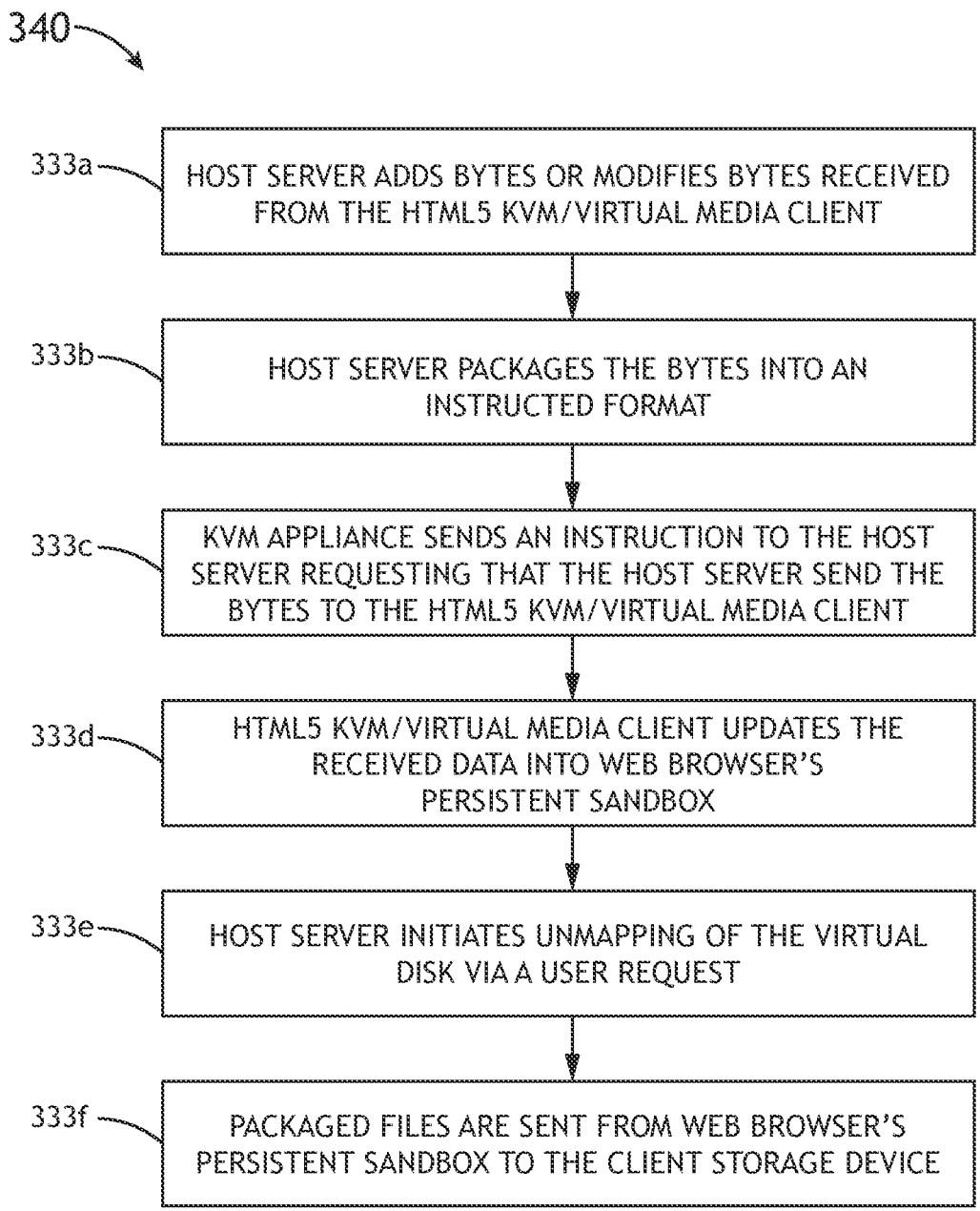

Referring now to FIGS. 3A and 3B, flowcharts 300, 340 illustrating examples of a sequence of operations between the HTML5 KVM/virtual media client 20 and the Host server 16 are presented, with different decision-making and byte transfer operations than those demonstrated in flowcharts 100, 140 of FIGS. 2A and 2B. In flowchart 300, operations 302 through 306 are identical to operations 102 through 106 of flowchart 100, respectively. In operation 307*a*, a decision is made (e.g., either automatically or by the user) on whether the image will be mapped as a read-only (RO) or read-write (RW) image. If the decision is to map the image as read-only (RO), the image will be written to the temporary sandbox 21. If the decision is to map the image as read-write (RW), the flowchart then continues onto operation 307*b*, where the HTML5 KVM/virtual media client 20 requests permission from the user to write a virtual disk image (e.g., in the form of packaged bytes) to the Web browser's persistent sandbox 22. If no approval is given by the user, the packaged bytes will be written to the temporary sandbox 21. If approval is given by the user, the flowchart continues to the next operation 308.

Operations 308 through 318 of flowchart 300 may be identical to operations 108 through 118 of flowchart 100, respectively. Operation 333 of flowchart 300 and operation 133 of flowchart 100 both disclose the transfer of bytes from the host server 16 to the workstation 12, however, these operations differ in how the transfer is performed, as shown in flowchart 340. For example, after the host server 16 adds bytes or modifies bytes received from the HTML5 KVM/virtual media client 20 in operation 333*a*, the host server 16 then packages the bytes into an instructed format, as shown in operation 333*b*. The KVM appliance 18 then sends an instruction to the host server 16 requesting that the host server 16 send the bytes to the HTML5 KVM/virtual media client 20, as shown in operation 333*c*.

In operation 333*d*, the HTML5 KVM/virtual media client 20 updates the received data into Web browser's persistent sandbox 22, wherein the host server 16 initiates unmapping of the virtual disk via a user request in step 333*e*. Packaged files are then sent from the Web browser's persistent sandbox 22 to the client storage device, as shown in operation 333*f*. Once the packaged files are sent from the persistent sandbox 22 to the client storage device in operation, the method returns to operation 334 of flowchart 100, wherein KVM appliance firmware receives the ejection notice and sends notice (e.g., via AVMP message) to the KVM/virtual media client 20, which then unmaps the virtual disk.

As described herein, a Chromium™ based Web browser, the CHROME™ Web browser, is utilized for transferring host data from the host server 16 to the workstation 12. The CHROME™ Web browser has both a temporary sandbox 21, a persistent sandbox 22, a HTML5 KVM virtual media client 20, and can allow files to be written directly from memory into the persistent sandbox 22. The Chromium™ based Web browser provides specific advantages over other Web browsers. In particular, the persistent sandbox of the Chromium™ based Web browser uses free space from the user's hard drive, allowing the transfer of larger image files.

It should be understood that as more Web browsers 14 continue developing under HTML5-based protocols, many Web browsers have or will have abilities to perform the methods as described herein as detailed for the CHROME™ Web browser. This is particularly true for Chromium™-based Web browsers which include but are not limited to Amazon Silk™, Avast Secure Browser, Beaker™, Blisk™, Brave™, CodeWeavers CrossOver™ Comodo Dragon™, Coc Crossover™, Epic Browser™, Falkon™' Quitebrowser™, Microsoft Edge™, Naver Whale™, Opera™, Qihoo 360 Secure Browser™, SatamWeb™ Samsung Internet™, Sleipnir™, Slimjet™, SRWare Iron™' Torch™, Ungoogled-Chromium™, Vivaldi™, and Yandex Browser™ Web Browsers. Accordingly, systems and methods described herein that include the Chrome™ Web browser should not be interpreted as a limitation on the particular Web browser 14 included within the system and methods of this disclosure, but merely as an illustration.

In accordance with flowcharts 100 and 300, the system 10 may also perform operations to determine if the additional bytes are needed for completing the transfer of bytes. These operations are detailed in U.S. Pat. No. 10,198,285 entitled, "SYSTEM AND METHOD FOR CREATING VIRTUAL DISK IMAGES FOR USE WITH A REMOTE COMPUTER", which is incorporated by reference in its entirety.

It is noted herein the methods described within this disclosure are not limited to the operations and/or sub-operations provided. The methods herein may include more or fewer operations and/or sub-operations. One or more operations or sub-operations of methods described within this disclosure may be performed simultaneously. One or more operations or sub-operations of methods described within this disclosure may be formed sequentially, including in the order provided or an order other than provided. Therefore, the above description should not be interpreted as a limitation on the scope of the present disclosure but merely an illustration.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A system for creating and exposing virtual disk images to a host server and transferring host data from a host server to a user device during a KVM session, using an HTML5 KVM/virtual media client running in a Web browser of the user device, the Web browser having both a temporary sandbox and a persistent sandbox, comprising:
a user device having the Web browser running thereon;
an HTML5 KVM/virtual media client running in the Web browser, the system configured to:
package selected content using a selected format to create a disk image of the selected content in the persistent sandbox;
notify the host server that a virtual disk image is available and exposing the virtual disk image in the persistent sandbox for use to the host server;
respond to a request from the host server for data corresponding to a portion of the virtual disk image;
use the HTML5 KVM/virtual media client to implement a reverse lookup operation to translate the request for data into at least a portion of at least one specific file that makes up the virtual disk image;
use the HTML5 KVM/virtual media client to send bytes of data corresponding to the least the portion of the one specific file to the host server;
modify the bytes of data received from the HTML5 KVM/virtual media client with host data to produce modified bytes;
use the HTML5 KVM/virtual media client to send instructions to the host server;
use the HTML5 KVM/virtual media client to send modified data to the HTML5 KVM/virtual media client;
package the modified bytes into an instructed format to produce packaged bytes;
initiate an unmapping of the virtual disk;
send the packaged data to the persistent sandbox;
select a client storage device to receive the packaged data; and
send the packaged data from the persistent sandbox to the client storage device.

2. The system of claim 1, wherein the modified bytes comprise at least a portion of an image file.

3. The system of claim 1, wherein the modified bytes include log data or data records produced by the host server.

4. The system of claim 1, wherein the instructed format is a FAT type filesystem, the FAT type filesystem being FAT32.

5. The system of claim 1, wherein the client storage device is a USB memory device.

6. The system of claim 1, wherein the Web Browser comprises a CHROME™ Web browser.

7. A method for transferring host data from a host server to a user device during a KVM session, using an HTML5 KVM/virtual media client running in a Web browser of a user device, the Web browser having a temporary sandbox and a persistent sandbox, the method comprising:
modifying original data, received from the HTML5 KVM/virtual media client running in the Web browser of the user device in which the Web browser includes the temporary sandbox and the persistent sandbox, with host data to produce modified bytes, wherein the modified bytes are stored as a disk image on a virtual disk;
using the HTML5 KVM/virtual media client to send instructions to the host server, wherein the instructions include sending the modified bytes to the HTML5 KVM/virtual media client;
packaging the modified bytes into an instructed format that produces packaged bytes;
initiating an unmapping of the virtual disk;
sending the packaged bytes to the persistent sandbox;
selecting a client storage device to receive the packaged bytes;
sending the packaged bytes from the persistent sandbox to the client storage device.

8. The method of claim 7, wherein the modified bytes comprise at least a portion of an image file.

9. The method of claim 7, wherein the modified bytes include log data or data records produced by the host server.

10. The method of claim 7, wherein the instructed format is a FAT type filesystem, the FAT type filesystem being FAT32.

11. The method of claim 7, wherein the client storage device is a USB memory device.

12. The method of claim 7, wherein the Web Browser comprises a CHROME™ Web browser.

13. A method for creating and exposing virtual disk images to a host server and transferring host data from a host server to a user's device during a KVM session, using an HTML5 KVM/virtual media client running in a Web browser of a user's device, the Web browser having both a temporary sandbox and a persistent sandbox, the method comprising:
sending a selection to the host server a specific virtual media device to be mapped on the host server;
using the HTML5 KVM/virtual media client running in the Web browser of the user device in which the Web browser includes the temporary sandbox and the persistent sandbox to package selected content into a selected format;
writing the selected format into the persistent sandbox;
creating a virtual disk image of the selected content in the persistent sandbox;
notifying the host server that the virtual disk image is available;
exposing the virtual disk image in the persistent sandbox for use to the host server;
using the host server to obtain the virtual disk image from the persistent sandbox;
using the host server to send a request to the HTML5 KVM/virtual media client to retrieve a portion of the data of the virtual disk image;
using the HTML5 KVM/virtual media client to translate the request into at least one specific file that makes up the virtual disk image, and to send bytes of data corresponding to the at least one specific file to the host server;
using the host server to receive the bytes of data corresponding to the at least one specific file;
modifying the bytes of data received from the HTML5 KVM/virtual media client with host data to produce modified bytes;
using the HTML5 KVM/virtual media client to send instructions to the host server, wherein the instructions include sending the modified bytes to the HTML5 KVM/virtual media client;
packaging the modified bytes into an instructed format that produces packaged bytes;
initiating an unmapping of the virtual disk;
sending the packaged bytes to the persistent sandbox;
selecting a client storage device to receive the packaged bytes; and
sending the packaged bytes from the persistent sandbox to the client storage device.

14. The method of claim 13, wherein the modified bytes comprise at least a portion of an image file.

15. The method of claim 13, wherein the modified bytes include log data or data records produced by the host server.

16. The method of claim 13, wherein the instructed format is a FAT type filesystem, the FAT type filesystem being FAT32.

17. The method of claim 13, wherein the client storage device is a USB memory device.

18. The method of claim 13, wherein the Web Browser comprises a CHROME™ Web browser.

* * * * *